though it is known to utilize amorphous or crystalline alumino-silicate zeolites in combination with a hydrogenation catalyst as hydroisomerization catalysts, the art has failed to realize the benefits of conducting such a zeolite catalyzed hydroisomerization of gasoline-boiling-range paraffins at a temperature in the range of 290–340° C. and at a liquid hourly space velocity in the range of

United States Patent Office 3,770,845
Patented Nov. 6, 1973

3,770,845
PARAFFIN HYDROISOMERIZATION WITH A COMBINED CATALYST OF A HYDROGENATION COMPONENT AND A POLYVALENT METAL CATION-EXCHANGED ZEOLITE
Alfred E. Hirschler, Springfield, Pa., assignor to Sun Oil Company of Pennsylvania, Philadelphia, Pa.
No Drawing. Continuation-in-part of applications Ser. No. 715,944, Mar. 26, 1969, and Ser. No. 28,608, Apr. 15, 1970. This application Nov. 17, 1970, Ser. No. 90,463
The portion of the term of the patent subsequent to Nov. 17, 1970, has been disclaimed
Int. Cl. C07c 5/30
U.S. Cl. 260—683.65                    10 Claims

ABSTRACT OF THE DISCLOSURE

Paraffin hydroisomerization of gasoline-boiling-range paraffins is carried out at a temperature of 300–340° C. with a combined catalyst of a hydrogenation component and a zeolite which is at least 5% crystalline, evolves at 1800° F. ignition analysis 0.5–2 molecules of water for each atom of exchanged polyvalent metal, and which contains less than one alkali metal cation for every ten atoms of aluminum, hydrogen and at least 25% of the electronic equivalents are polyvalent metals, i.e. yttrium, gadolinium, lanthanum, magnesium, silver, zinc, aluminum, nickel, chromium and combinations thereof. The hydrogenation component is at least one of the following metals, their oxides or sulfides: nickel, cobalt, palladium, ruthenium, rhodium, rhenium and platinum.

CROSS REFERENCES TO RELATED APPLICATIONS

This application is a continuation-in-part of my copending applications Ser. No. 715,944, filed Mar. 26, 1969 and Ser. No. 28,608, filed Apr. 15, 1970.

Zeolites which can be utilized as catalysts in the subject process have been described in the following copending applications:

| Serial No. | Filing date | Patent No. | Applicants |
|---|---|---|---|
| 581,129 | 8-25-66 | Abandoned | Kirsch-Barmby-Potts. |
| 590,225 | 10-28-66 | 3,396,203 | Bushick. |
| 715,994 | 3-26-68 | 3,541,001 | Hirschler. |
| 715,998 | 3-26-68 | 3,624,173 | Kirsch-Barmby-Potts. |
| 716,190 | 3-26-68 | | Do. |
| 718,980 | 3-26-68 | 3,534,114 | Bushick. |
| 749,714 | 8- 2-68 | | Kirsch-Barmby-Potts. |
| 28,608 | 4-15-70 | | Hirschler. |
| 28,942 | 4-15-70 | | Hirschler-Driscoll. |
| 34,209 | 5- 4-70 | | Kirsch-Barmby-Potts. |

All of these applications and the present application are assigned to subsidiaries of the Sun Oil Company, (Pa), a corporation of Pennsylvania. The disclosure therein is hereby incorporated in the present application.

BACKGROUND OF THE INVENTION

Although it is known to utilize amorphous or crystalline alumino-silicate zeolites in combination with a hydrogenation catalyst as hydroisomerization catalysts, the art has failed to realize the benefits of conducting such a zeolite catalyzed hydroisomerization of gasoline-boiling-range paraffins at a temperature in the range of 290–340° C. and at a liquid hourly space velocity in the range of 0.5–10 (preferably 2–6) and wherein the zeolite catalyst contains a catalytically critical amount of water which can be evolved upon analysis at 1800° F. My copending application Ser. No. 715,944 now U.S. 3,541,001, issued Nov. 17, 1970 taught this reaction, at 300–340° C., with a combination of a Gd alumino-silicate catalyst with a hydrogenation catalyst, and my copending application Ser. No. 28,608 describes, generically and specifically, other catalysts and conditions for such a process.

BRIEF SUMMARY OF THE INVENTION

A paraffin hydroisomerization process comprises contacting a petroleum feed containing acyclic paraffins in the gasoline boiling range at a temperature in the range of 300–340° C. with an alumino-silicate zeolite which is at least 5% crystalline and which contains from 0.1–10 wt. percent of a hydrogenation catalyst, and recovering an upgraded conversion product. The liquid hourly space velocity is in the range of 1–10 (preferably 2–5). The pressure can be in the range of 250–1000 p.s.i.g. (preferably 300–500), the hydrogen being 50–100% pure.

The feed to the process can comprise a straight run gasoline, a "Udex" raffinate, or normal paraffins separated from petroleum feeds (as by molecular sieve adsorption).

The zeolite can be up to 95% amorphous but preferably is at least 50% crystalline by X-ray analysis and can adsorb benzene. The zeolite, in the hydrated condition, is chemically characterized by the empirical formula $$M_x(AlO_2)_x(SiO_2)_y \cdot (H_2O)_z,$$

where M is a metal cation and/or hydrogen $x$, $y$ and $z$ are integers, the ratio $x:y$ being usually from 1.0 to 0.01 and where at least 25% (and preferably more than 40%) of the negative charge associated with the aluminum of the alumino-silicate framework is satisfied by exchanged cations of a polyvalent metal or cations of an oxide or a hydroxide of a polyvalent metal. Preferably, upon ignition analysis the catalyst will evolve from 0.25 to 6 molecules of water (more preferably 0.5–3, typically 1–2) for each atom of exchanged polyvalent metal and/or hydrogen in the catalyst. The preferred cations of polyvalent metals, are cations containing magnesium, aluminum, silver, nickel, zinc, cerium, lanthanum, gadolinium or dysprosium. The preferred hydrogenation catalysts comprise at least one member from the group consisting of molybdenum, nickel, cobalt, palladium, ruthenium, rhodium, rhenium, platinum and oxides and sulfides thereof. For the hydroisomerization of petroleum refinery streams which contain at least 20% of $C_5$–$C_9$ normal paraffin, the preferred catalyst combination contains from 0. to 2 weight percent of platinum, rhenium or palladium or from 1 to 10% of nickel.

One class of preferred zeolite catalyst is crystalline and capable of adsorbing benzene, has an atomic ratio Al/Si of 0.65 to 0.35 and contains at least one $M(OH)_2^+$ cation (e.g. $Gd(OH)_2^+$) for every 8 atoms of aluminum in the alumino-silicate framework. Such catalysts can also contain or consist essentially of cations of yttrium. In conversions involving oxidative regeneration of this catalyst (or adsorbant), crystallinity can decrease, usually accompanied by a decrease in activity and/or selectivity. The resulting, more amorphous, zeolite can be effective as a catalyst, particularly at conversion temperatures which are greater than those required for the corresponding conversion with an equal weight of more highly crystalline zeolite.

FURTHER DESCRIPTION OF THE INVENTION

In the previously cited application Ser. No. 715,994, it was disclosed that a substantially anhydrous GdHY zeolite catalyst, prepared by activation of a crystalline GdNH⁴Y zeolite (obtained by Gd-cation exchange of highly ammonium-exchanged sodium Y zeolite), is particularly effective for hydroisomerization of paraffins in the gasoline boiling range.

In the Gd alumino-silicate catalyst, at least 25% and, preferably, at least 40% of the electronegativity associated with the alumino-silicate framework is satisfied by cations of gadolinium or of its oxides or hydroxides. When the Gd catalyst contains less than one alkali metal cation (e.g. Na⁺) for every 4 aluminum atoms in the aluminosilicate framework, the catalyst is also useful for such hydrocarbon conversion reactions as isomerizing polycyclic aromatic hydrocarbons, paraffin-olefin alkylation and the cracking of gas oil. Preferably, the Gd alumino-silicate zeolite is crystalline and is chemically characterized by the empirical formula $M_x(AlO_2)_x(SiO_2)_y \cdot (H_2O)_z$, where $x$, $y$ and $z$ are integers, the ratio $x/y$ being from 1.0 to 0.2 and where M is chosen from at least one of the following groups:

(1) at least one $Gd^{+3}$ cation for every 12 atoms of aluminum in the alumino-silicate framework of said zeolite;
(2) at least one cation of $Gd(OH)^{+2}$ for every 8 atoms of aluminum in the alumino-silicate framework of said zeolite;
(3) at least one cation of $Gd(OH)_2^{+1}$ for every 4 atoms of aluminum in the alumino-silicate framework of said zeolite;
(4) a combination of the members of at least two of the above groups;

and wherein the balance of the cations necessary for electronic equivalency comprises H⁺ or cations of metals, metal oxides or metal hydroxides and wherein there is less than one alkali metal cation for every four atoms of aluminum in the alumino-silicate zeolite, more preferably, less than one alkali metal cation for every ten atoms of aluminum.

The Gd zeolite can contain as additional cations, the cations of magnesium, aluminum, silver, nickel, zinc, cerium, lanthanum and mixtures of these cations. In such catalysts it is preferred that at least one such cation is present for every 20 atoms of aluminum in the aluminosilicate framework of said zeolite.

The GdHY zeolite catalyst is one example of a preferred class of zeolite catalyst containing hydrogen and exchanged cations of polyvalent metals and wherein upon ignition analysis at 1800° F., a catalytically critical quantity of water is evolved (typically, 1–3 moles H₂O/atom of Gd). The catalyst also must have a low content of alkali metal cations (e.g. Na⁺), usually less than 0.5% by weight (typically less than 0.1%), on an ignited basis.

For most hydroisomerizations, the ratio $x/z$ in the empirical formula of the zeolite should be in the range of 0.25 to 2. If excess water is present, the zeolite should be "activated" by heating according to the procedure disclosed in the aforementioned applications of Kirsch, Barmby and Potts. If the zeolite is deficient in "bound" water can be added, as by exposure to steam air or nitrogen. If the catalyst loses considerable activity on "aging" in the hydroisomerization reactor, it can be regenerated, as by oxidative burning, using, for example, the techniques in Ser. No. 34,209.

As used herein, the term "framework," in reference to the alumino-silicate portion of the zeolite (which can be crystalline or amorphous), excludes those aluminum ions which are in exchange positions and which are neutralizing some of the negative charge associated with the aluminum atoms in the alumino-silicate tetrahedra of the zeolite. Note that aluminum in the alumino-silicate framework can be either trigonal or tetrahedral.

For such reactions as reforming, aromatization, hydrogen transfer, hydrocracking and hydroisomerization, it is preferred that the catalyst have incorporated therewith from 0.05 to 25% (more preferably, 0.05 to 5%) of a hydrogenation catalyst component containing a hydrogen-active metal such as platinum, palladium, rhodium, rhenium, ruthenium, molybdenum, cobalt or nickel (or a chemical compound, as an oxide or sulfide, of such a metal). The hydrogen-active metal can also be incorporated on a carrier (as alpha-alumina, microporous silica, conventional amorphous silica-alumina cracking catalyst, or acid-exchanged clays, such as montmorillonites or kaolin). When the hydrogen-active metal component (or a chemical compound of the metal) is so incorporated on a carrier, it is preferred that the zeolite catalyst be physically admixed therewith.

A preferred class of catalysts useful in the process are those substantially anhydrous acidic crystalline or partially crystalline partially amorphous alumino-silicate zeolites which in hydrated form are chemically characterized by the empirical formula

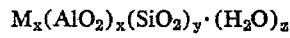

$$M_x(AlO_2)_x(SiO_2)_y \cdot (H_2O)_z$$

where M is H⁺ and/or an equivalent valence of metal cations and $x$, $y$, and $z$ are integers, the ratio $x:y$ being usually, but not necessarily, from 1.0 to 0.01 for the crystalline portion of the zeolite and in the range of 5.0 to 0.05 for the amorphous portion of the zeolite. A 10% aqueous suspension of the acidic zeolite catalyst will have a pH less than 7, and preferably less than 5. It is further preferred that the critical pore diameter of the crystalline zeolite be at least large enough to permit adsorption of benzene. Also preferred are those acidic zeolites which contain both H⁺ and polyvalent metal cations, including metal cations in which part of the charge is balanced by oxide or hydroxyl groups, although catalysts where the exchanged ions consist essentially of H⁺ or polyvalent metal hydroxides, e.g. $La(OH)^{2+}$ or $La(OH)_2^+$, are effective (in conjunction with a hydrogenation catalyst) in catalyzing paraffin hydroisomerization. In general the exchanged ions, preferably, consist essentially of H⁺ when the Al/Si ratio is less than about 0.1.

The catalyst combination can be in the form of a fixed bed or suspended (e.g., as a fluidized bed) in the reaction mixture. Preferably, in a fixed bed the liquid hourly space velocity (based on the fresh olefin feed) is in the order of 0.5–10, more preferably 2–6 (typically, 3–4).

These catalysts are normally prepared from alkali metal-containing zeolites (which in 10% aqueous suspension will have a pH greater than 7, and usually greater than 9) by ion-exchanging the alkali metal ions for H⁺ and/or polyvalent metal cations. Hydrogen-ion or proton exchange can be effected by exchange from aqueous medium with mineral acids, such as dilute aqueous HCl, or by exchange with solutions of polyvalent metal ions, such as aqueous $ZnCl_2$ and $Ce(NO_3)_3$. For crystalline zeolites such as the faujasites which can be degraded by direct acid exchange, a preferred exchange media comprises aqueous solutions containing, as at least one component, ammonium salts. With the mordenites, acid leaching of alumina (e.g. U.S. Pat. 3,480,539) can increase catalyst activity. Polyvalent metal exchange can be effected with solutions of salts of the metals such as their nitrates. The exchange can also be effected in non-aqueous media (e.g., liquid ammonia or amines).

The preferred catalysts can be prepared by the procedures disclosed in U.S. Pat. 3,480,539 and the previously cited applications, one such procedure involves ammonium ion exchange, followed by polyvalent metal cation exchange, of an alkali metal faujasite, such as sodium type Y zeolite, having a $SiO_2/Al_2O_3$ molar ratio in the range of 4.0 to 5.0. Lanthanum, cerium, gadolinium, and dysprosium exchanged catalyst have exhibited superior results. Such rare earth (or La) exchanged crystalline zeolites are less likely to lose crystallinity on oxidative regeneration (especially with steaming), as at 500–550° C., than protonated zeolite (e.g. HY) prepared from ammonium exchanged zeolite.

In the preferred catalysts, even after activation at a final temperature in the range of 200–500° C., water can be evolved from the catalyst upon ignition at 1800° F. This water is sometimes called "bound" or "combined" or "complexed" water to distinguish from that loosely held water which is readily evolved from the exchanged zeolite upon initial drying thereof.

Low sodium-content yttrium zeolite (e.g. by activation of yttrium exchanged ammonium Y zeolite), AlHY, ZnHY, LaHY hydrogen mordenite, and GdHY are among the preferred zeolite catalysts for hydroisomerization of normal paraffins in the gasoline boiling range.

The alumino-silicate zeolite catalysts referred to herein are utilized in combination with a hydrogenation catalyst (such as the catalyst combination of U.S. Pat. 3,396,203 of Bushick, which issued Aug. 6, 1968). Such combinations of a zeolite catalyst and hydrogenation catalyst are good isomerization catalysts, especially for hydroisomerization at 300–340° C., LHSV 1–10, 250–1000 p.s.i. hydrogen of n-paraffins (such as those recovered from petroleum streams by means of molecular sieve adsorbents) or low octaine paraffin gasoline streams (as for increasing the octane number) or for decreasing the pour point of waxy lube oil streams (e.g. see U.S. 3,658,689, issued Apr. 25, 1972 to coinventors Steinmetz and Barmby).

ZnHY with 0.5% Pt is considerably better as such an isomerization catalyst than a Pt-loaded MgHY zeolite or even PtCeHY. For example, pentane was isomerized at 325° C., 400 p.s.i.g., LHSV of 4 and H$_2$:hydrocarbon of 1.9. While MgHY produced 34.4% isopentane, the ZnHY gave 51.1%. The hydrocracking of the PtZnHY is also much higher than the other zeolites, indicating it should be a superior hydrocracking catalyst.

The zinc zeolite has also been shown to have good activity for hydroisomerization of n-hexane and straight run gasoline. It is somewhat less active for isomerization than yttrium or lanthanum Y zeolites, but has greater hydrocracking activity than either.

The isomerization step can be combined with separation of the n-paraffins in the feed by distillation and/or molecular sieve adsorption.

Low-sodium yttrium zeolite on which there is incorporated a hydrogenation-dehydrogenation component, such as a metal of Group VIII of the Periodic Table, are highly active catalysts for the hydroisomerization of paraffins and naphthenes or for hydrocracking. For hydroisomerization of n-hexane or C$_5$–C$_6$ straight run gasoline the yttrium Y zeolite (YY) is somewhat better than LaY (a most active catalyst). It is appreciably better than GdY and considerably better than CeY.

As used herein, an abbreviation of the form CeY indicates a Type Y zeolite containing exchanged cations of cerium (said cations being at least 75% of the total exchange capacity of the zeolite). Similarly the notation CeHX indicates a Type X zeolite containing cerium and protonated (or hydrogen-exchanged sites), the combined total of cerium and protonated sites being at least 75% of the total exchange capacity (but preferably at least 90%), and the cations of Ce (or other indicated polyvalent metal cations) should preferably satisfy at least 25% of the total exchange capacity satisfied by protons and/or indicated polyvalent metal cations. The content of cations of alkali metals is preferably less than 10% of the total exchange capacity of the zeolite.

The high activity catalysts (such as YHY, ZnHY, LaHY) can advantageously be used in processes combining isomerization with separation of the feed by distillation and/or molecular sieve separation of normal paraffins. For example, a hexane cut is distilled into an overhead fraction, consisting of branched hexanes, and a bottom fraction of chiefly n-hexane and some 3-methylpentane. The bottom fraction is hydroisomerized, and the isomerate combined with the overhead fraction for blending into gasoline. Alternatively the isomerate could be recycled to the distillation zone and the total overhead used for gasoline blending, the n-hexane being removed and recycled to the isomerization zone.

Another mode of operation is removal of n-C$_5$ and n-C$_6$ from straight run gasoline fraction or "Udex" raffinate using a molecular sieve separation process such as "Linde Isosieve." The n-paraffins only are isomerized over the active zeolite catalyst and the product recycled to the separation zone. The isoparaffin fraction, free of n-paraffins is used for gasoline blending. Alternatively, the isomerate could be blended into the isohexane fraction without recycle.

When a cation-exchanged faujasite catalyst, such as rare earth or magnesium Y or X zeolite is prepared by ion exchange of a low-sodium content ammonium zeolite, there is a maximum in the activity vs. percent exchanged metal or activity vs. number of exchanges. The following data for n-pentane hydroiosmerization at 325° C., 400 p.s.i.g., and at equivalent contact times show this effect with LaHY zeolite containing 0.2–3.0 Pt:

| No. of La exchanges | La equiv. per 100 g. | Percent isopentane in product |
|---|---|---|
| 4 | 0.315 | 50.7 |
| 8 | 0.345 | 60.9 |
| 18 | 0.39 | 58.4 |

Similar phenomena are observed on n-hexane and straight run gasoline isomerization.

On activation, the NH$_4^+$ ions remaining after exchange are converted to protonic, or HY sites. The above data indicate that there is an optimum ratio of metal cations to protons in the ion-exchange positions of the zeolite. Other cations, both rare earths and divalent cations can show a similar effect, though the optimum cation/proton ratio will vary somewhat depending on the cation. Also the activity maximum can apply to many other carbonium-ion hydrocarbon reactions such as aromatic alkylation, polymerization, cracking, reforming, etc.

For given maximum activation temperatures in the range of 300–550° C., an acidic alumino-silicate catalyst containing more than one exchanged polyvalent metal ion can sometimes be more active for isomerization than a similar zeolite exchanged to the same total polyvalent cation content with only a single metal species. For example, a low alkali metal content Y or X ammonium zeolite, exchanged with Ni$^{+2}$ and either Mg$^{+2}$ or Zn$^{+2}$, can (after activation) give higher yields for double bond isomerization than either NiHY or MgZnHY catalysts (similarly activated) having the same degree of exchange. A catalyst, useful for the isomerization and hydroisomerization of n-pentane to isopentane, consists essentially of a substantially dehydrated crystalline alumino-silicate zeolite which, in hydrated form, is chemically characterized by the empirical formula

wherein $x$, $y$ and $z$ are integers, the ratio $x/y$ being in the range from 1.0 to 0.2, and wherein $a$ is in the range from $x/8$ to $3x/8$, $b$ is in the range from $x/8$ to $3x/8$. M is either Zn or Mg, $c$ is no greater than $x/4$, and wherein $$2a+2b+c \text{ equal } x$$

Depending on the activation temperature, the catalyst can evolve from 0.25 to 5 moles of water (preferably 0.5–3) per atom of polyvalent exchanged metal.

Other useful zeolites containing more than one exchanged cation of a polyvalent metal are MgAlHY, AgZnHX, NiCrHX, NiCrHY, NiCoHY, NiCoHX, NiAlHY, AgZnHX and AgZnHY. Preferably, the exchange of the multiple metals is done simultaneously (rather than serially). That is, the low sodium content (preferably less than 0.5% wt. on an ignited basis) ammonium X or Y zeolite is contacted with an exchange solution containing cations of two or more polyvalent metals (preferably divalent metals).

If the catalyst activity appreciably decreases during the course of the reaction, the catalyst may be separated from the hydrocarbon reactants and regenerated, as by burning in air. After such burning, water can be added to the catalyst, as by exposure to steam in air or nitrogen. When a hydrogen-active metal is incorporated into the zeolite catalyst, it is sometimes advantageous to reduce the regenerated combination with hydrogen, preferably at 250° to 800° F., prior to introduction of the hydrocarbonaceous feed.

ILLUSTRATIVE EXAMPLES

In the following examples, Example I shows the preparation of a preferred zeolite catalyst, and Example II shows the incorporation therewith of a Pt-hydrogenation catalyst. Example III shows the hydroisomerization of a straight run gasoline stream, by contacting with the Gd catalyst/hydrogenation catalyst combination of Example II, to upgrade the octane rating of the gasoline.

Example I

About 500 g. of NaY zeolite was exchanged, filtered and washed for 16 cycles with aqueous $NH_4Cl$ utilizing the procedures disclosed in the aforementioned United States application, Ser. No. 581,129. The resulting $NH_4Y$ zeolite was similarly exchanged for 16 cycles with aqueous gadolinium nitrate. The resulting Gd-exchanged $NH_4$-exchanged zeolite was washed free of nitrate and unexchanged gadolinium ions, with distilled water, and dried in an oven at about 120° to produce an $GdNH_4Y$ zeolite. The zeolite was activated by heating slowly to 400° C. to remove water and decompose the bulk of any remaining ammonium ions. This activation utilized the procedures disclosed in the aforementioned U.S. Ser. No. 581,129. The resulting substantially anhydrous GdHY zeolite was crystalline and capable of adsorbing benzene. The weight loss upon ignition analysis at 1800° C., of the activated zeolite was 3.41%.

Example II

A solution of $Pt(NH_3)_2Cl_2$ in water was added dropwise with stirring to a dilute aqueous suspension of the unactivated zeolite of Example I, at 55° C. The amount of $Pt(NH_3)_2Cl_2$ used was equivalent to 0.5% Pt in the activated catalyst. After the Pt salt addition was complete (about 1 hr.), the solution was stirred at 55° C. for 30 minutes, filtered, and the catalyst washed with distilled water until the washings were free of chloride ion. The catalyst was dried, heated to 400° C. in a stream of dry air and then reduced at 400° C. in the reactor in a flowing stream of $H_2$ for one hour.

Example III

A straight run gasoline feed was contacted at 325° C., 400 p.s.i.g. total pressure, in a tubular reactor, in the presence of added 100% hydrogen, with a bed of the reduced catalyst combination of Example II. Table 1, under the heading "GdHY+0.5% Pt" reports the analysis and calculated octane ratings of the product obtained from three such runs, at various space rates and hydrogen/hydrocarbon ratios. These data indicate that preferred conditions for such gasoline upgrading (of streams containing at least 25% $C_5$–$C_6$ normal paraffin) with a Gd zeolite-hydrogenation catalyst combination (at 300–340° C.) include an LHSV of 1 to 4 (more preferably 1.5 to 2.5) at a hydrogen to hydrocarbon molar ratio in the range of 1 to 6 (typically 1–3).

TABLE 1

Isomerization of $C_5$-$C_6$ gasoline for octane upgrading
All runs at 325° C. and 400 p.s.i.g.

| Hydrocarbon, wt. percent | Feed | Product GdHY plus 0.5% Pt | | |
|---|---|---|---|---|
| | | A[1] | B[2] | C[3] |
| $C_3$ | | 0.6 | 0.6 | 0.8 |
| i-$C_4$ | 0.3 | 2.4 | 1.9 | 2.3 |
| n-$C_4$ | 4.6 | 4.2 | 4.2 | 4.6 |
| i-$C_5$ | 18.7 | 35.2 | 33.2 | 31.9 |
| n-$C_5$ | 35.8 | 22.4 | 21.5 | 21.7 |
| 2.2-DMB | 1.1 | 4.4 | 5.5 | 5.5 |
| Cyclo $C_5$ | 3.5 | 3.0 | 3.0 | 3.0 |
| 2.3-DMB | 2.2 | 2.7 | 3.0 | 3.0 |
| 2-MP | 13.6 | 10.4 | 11.3 | 11.4 |
| 3-MP | 6.1 | 7.2 | 7.7 | 7.8 |
| n-$C_6$ | 9.4 | 6.5 | 7.0 | 7.0 |
| MCP | 1.7 | 0.9 | 1.0 | 0.9 |
| Cyclohexane | 0.2 | 0.1 | 0.1 | 0.1 |
| Benzene | 0.7 | | | |
| Heptanes | 0.5 | Trace | Trace | Trace |
| Octanes | 1.2 | | | |
| Percent iso $C_5$ in $C_5$ | 34.4 | 61 | 60.6 | 59.5 |
| Percent iso $C_6$ in $C_6$ | 71 | 79.2 | 79.7 | 79.8 |
| Percent 2.2-DMB in $C_6$ | 3.4 | 14.1 | 15.9 | 15.9 |
| Calculated: | | | | |
| F-1 clear | 70.6 | 79.1 | 78.8 | 77.5 |
| F-1 plus 3 cc | 88.6 | 94.9 | 94.7 | 93.0 |

[1] Run A at 1.6 LHSV and 2.1 $H_2$/HC.
[2] Run B at 0.8 LHSV and 3.7 $H_2$/HC.
[3] Run C at 0.8 LHSV and 3.1 $H_2$/HC.

NOTE.—$H_2$/HC=molar ratio hydrogen/hydrocarbon; LHSV=liquid hourly space velocity in volume of feed per volume of catalyst per hour. All catalysts conditioned 48 hours at 325° C./400 p.s.i.g., 3 LHSV with n-pentane prior to contact with the straight run gasoline.

What is claimed is:

1. A hydroisomerization process for upgrading octane rating of gasoline streams comprising contacting a hydrocarbonaceous feed containing gasoline-boiling-range paraffins, in a conversion zone in the presence of hydrogen at a conversion temperature in the range of 300–340° C., with a combined catalyst of a hydrogenation component and a polyvalent metal cation-exchanged zeolite which is capable of adsorbing benzene, said zeolite being in the range of 5–100 weight percent crystalline, said zeolite containing less than one alkali metal cation for every ten atoms of aluminum and being chemically characterized by the empirical formula $M_x(AlO_2)_x(SiO_2)_y \cdot (H_2O)_z$, where $x$, $y$ and $z$ integers, the ratio $x:y$ being from 1.0 to 0.2 and where M represents cations of alkali metal, polyvalent metal and hydrogen in amount sufficient to provide electronic equivalency, and wherein at least 25% of the electronic equivalents are satisfied by cations of polyvalent metal, and wherein said hydrogenation component is from 0.5 to 25% by weight of said combined catalyst and said component being at least one member of the group consisting of nickel, cobalt, palladium, ruthenium, rhodium, rhenium, platinum and the oxides and sulfides thereof, and wherein said zeolite catalyst upon ignition analysis at 1800° F. evolves from 0.5 to 2 molecules of water for each atom of exchanged polyvalent metal in said catalyst, and wherein said polyvalent metal is selected from the group consisting of yttrium, gadolinium, lanthanum, magnesium, silver, zinc, aluminum, nickel, chromium and combinations thereof.

2. Process according to claim 1 wherein the atomic ratio Al/Si of the alumino-silicate framework of the crystalline portion of said zeolite is from 0.65 to 0.35.

3. Process according to claim 1 wherein at least 40% of the negative electrical charge associated with the alumino-silicate framework is satisfied by at least one cation from the group consisting of $Gd^{+3}$, $Gd(OH)^{+2}$ and $Gd(OH)_2^{+1}$.

4. Process according to claim 3 wherein said hydrocarbonaceous feed is a petroleum refinery stream which contains at least 20% of $C_5$–$C_9$ normal paraffin and wherein there is recovered a hydrocarbon conversion product having an increased octane rating.

5. Process according to claim 4 wherein said catalyst contains from 0.1 to 2 weight percent of platinum, rhenium or palladium.

6. Process according to claim 5 wherein said stream contains at least 20% of $C_5$–$C_6$ normal paraffin and wherein said contacting is at a pressure in the range of 250–1000 p.s.i.g., the molar ratio hydrogen to feed hydrocarbon is in the range of 1 to 6; and the liquid hourly space velocity is in the range of 1 to 6 volumes of feed per volume of catalyst per hour, and the gas recycle is in the range of 0–10,000 s.c.f./bbl.

7. Process according to claim 1 wherein said zeolite contains less than 0.1 weight percent of alkali metal cations, on an ignited basis.

8. Process according to claim 1 wherein said zeolite is further characterized by the empirical formula $$a\text{Ni} \cdot b\text{M} \cdot c\text{H} \cdot x(\text{AlO}_2) \cdot y(\text{SiO}_2) \cdot z\text{H}_2\text{O}$$

wherein $x$, $y$ and $z$ are integers, $a$ is in the range from $x/8$ to $3x/8$, $b$ is in the range from $x/8$ to $3x/8$, M is either Zn or Mg, $c$ is no greater than $x/4$, and wherein $2a+2b+c$ is equal to $x$.

9. Process according to claim 1 wherein said zeolite is a type Y zeolite containing in the range of 0.315–0.39 La equivalents per 100 g. of said zeolite.

10. Process according to claim 4 wherein said catalyst contains from 1 to 10 weight percent of nickel.

References Cited
UNITED STATES PATENTS

| | | | |
|---|---|---|---|
| 3,236,761 | 2/1966 | Rabo et al. | 208—138 |
| 3,236,762 | 2/1966 | Rabo et al. | 208—138 |
| 3,301,917 | 1/1967 | Wise | 260—683.65 |
| 3,534,114 | 10/1970 | Bushick | 260—683.65 |
| 3,541,001 | 11/1970 | Hirschler | 260—683.65 |

DELBERT E. GANTZ, Primary Examiner

G. J. CRASANAKIS, Assistant Examiner

U.S. Cl. X.R.

208—138

UNITED STATES PATENT OFFICE
CERTIFICATE OF CORRECTION

Patent No. 3,770,845      Dated November 6, 1973

Inventor(s) Alfred E. Hirschler

It is certified that error appears in the above-identified patent and that said Letters Patent are hereby corrected as shown below:

The portion of the term of the patent subsequent to Nov. 17, 1987, has been disclaimed.

Signed and sealed this 2nd day of April 1974.

(SEAL)
Attest:

EDWARD M. FLETCHER, JR.
Attesting Officer

C. MARSHALL DANN
Commissioner of Patents